United States Patent [19]

Moore

[11] Patent Number: 5,040,839

[45] Date of Patent: Aug. 20, 1991

[54] HEAD LINER AND RETRACTABLE WINDOW SCREENS FOR AN AUTOMOBILE

[76] Inventor: Thurman Moore, 1920 Heliotrope Dr., Santa Ana, Calif. 92706

[21] Appl. No.: 475,913

[22] Filed: Feb. 6, 1990

[51] Int. Cl.⁵ ............................................ B60J 3/02
[52] U.S. Cl. ................................ 296/97.4; 296/97.8; 296/97.11
[58] Field of Search ................ 296/97.1, 97.4, 97.5, 296/97.8, 97.11

[56] References Cited

FOREIGN PATENT DOCUMENTS

| | | | |
|---|---|---|---|
| 2445408 | 4/1975 | Fed. Rep. of Germany | 296/97.11 |
| 2635535 | 3/1977 | Fed. Rep. of Germany | 296/97.4 |
| 67621 | 4/1986 | Japan | 296/97.11 |
| 2173752 | 10/1986 | United Kingdom | 296/97.4 |

Primary Examiner—Margaret A. Focarino
Assistant Examiner—Gary C. Hoge
Attorney, Agent, or Firm—Plante, Strauss, Vanderburgh & Connors

[57] ABSTRACT

There is disclosed a retractable sun screen for a motor vehicle. The sun screen can be provided for any or all of the windows of the vehicle and is used in combination with a head liner which has a storage recess for each sun screen. The sun screens can be manually operated. In its most preferred embodiment, however, the operator for the sun screens includes a motor driven actuator to extend or retract the sun screens. The sun screens are formed of thin film plastics, preferably of Mylar ® having thickness from 1 to about 10 mils, preferably from 2 to about 5 mils, which are mounted on rollers that are slidably positioned in roller tracks located in the leadliner of the motor vehicle. The invention also includes a sun visor of expanded width and length which is foldable for full retraction from the windshield or side window.

20 Claims, 4 Drawing Sheets

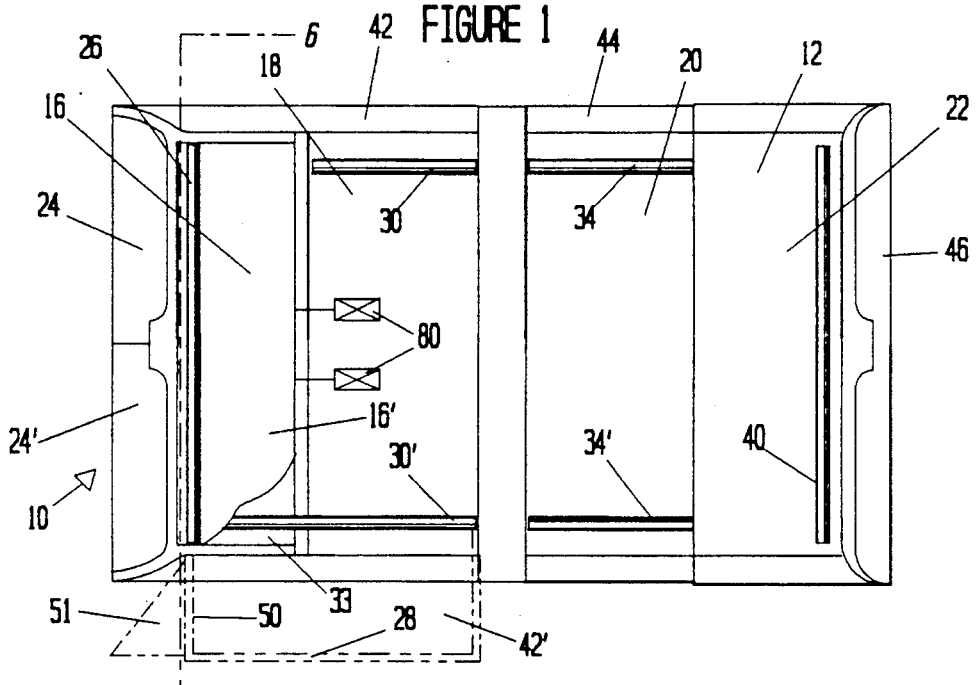
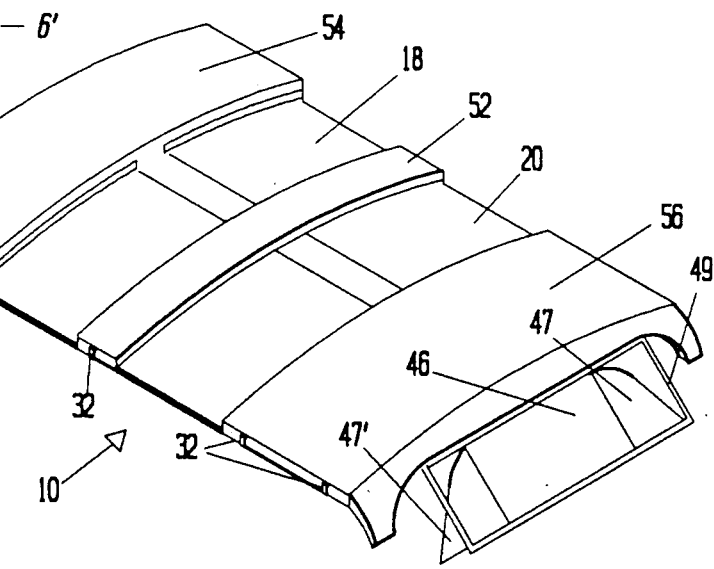

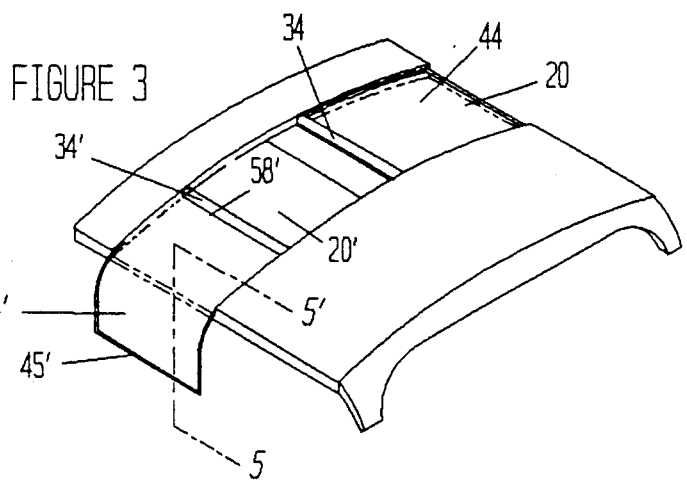
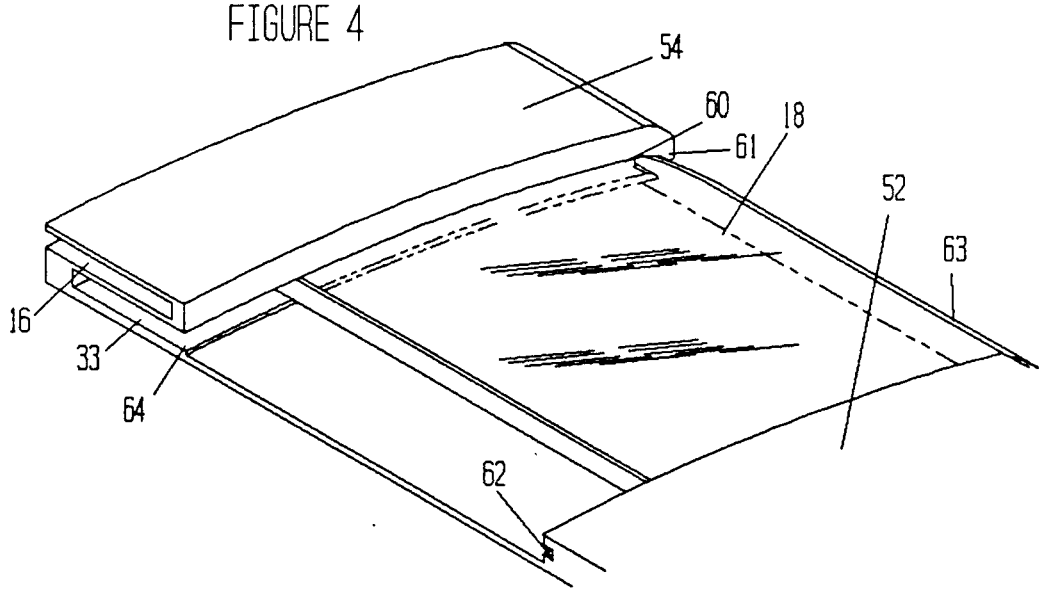

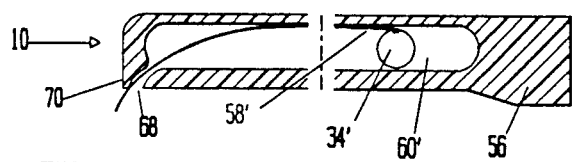
FIGURE 5
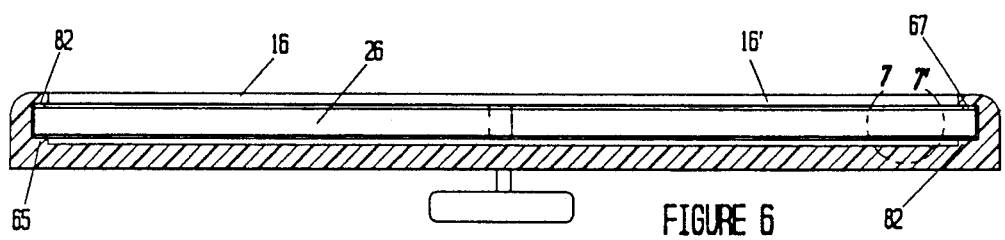
FIGURE 6
FIGURE 7
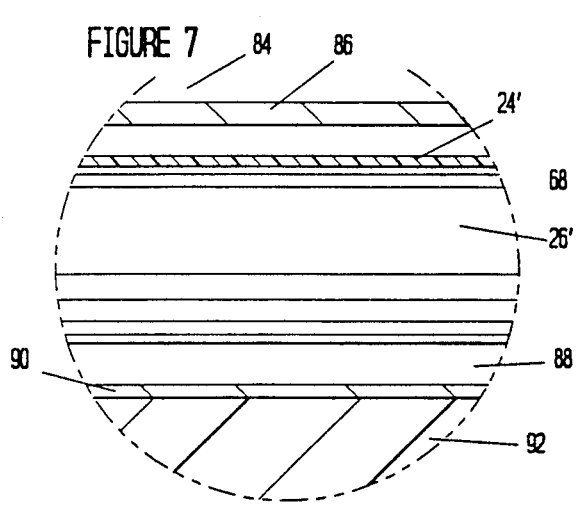
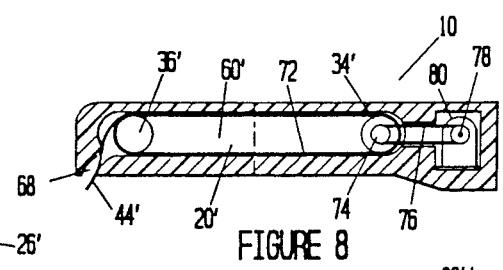
FIGURE 8
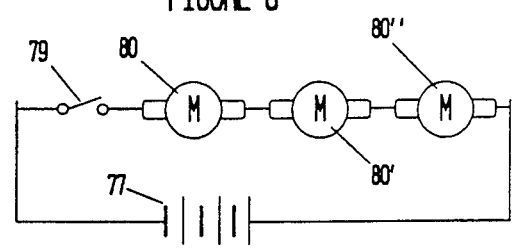
FIGURE 8A

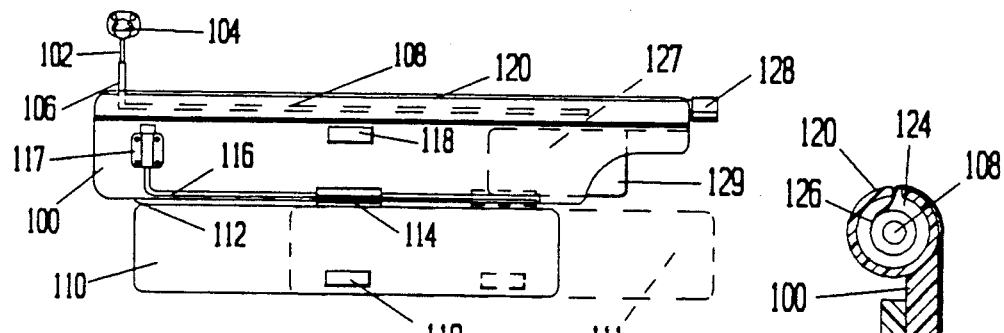
FIGURE 9
FIGURE 12
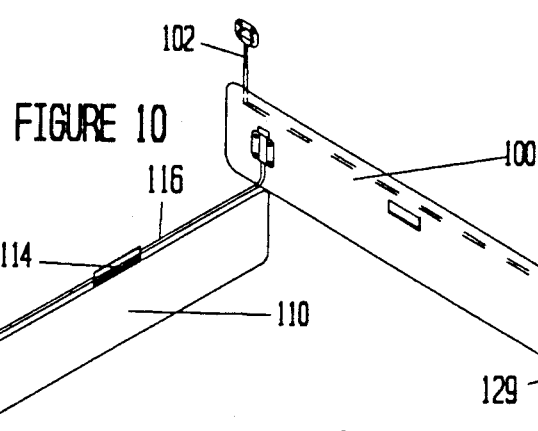
FIGURE 10
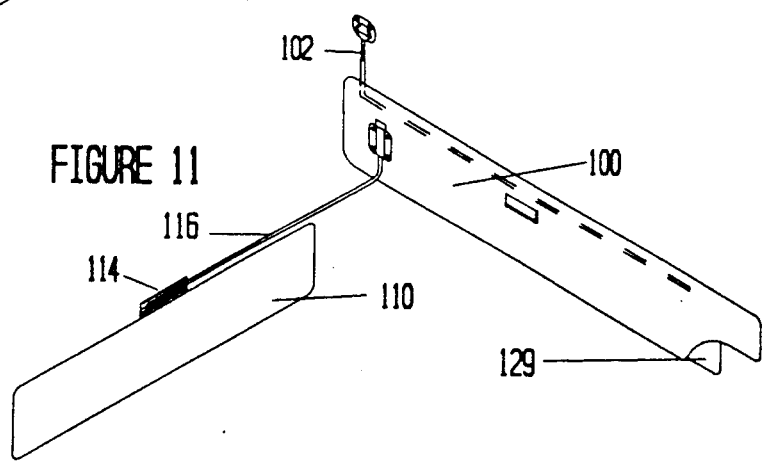
FIGURE 11

HEAD LINER AND RETRACTABLE WINDOW SCREENS FOR AN AUTOMOBILE

BACKGROUND OF THE INVENTION

1. Field of Invention

This invention relates to sun screen for a motor vehicle and in particular, to an improved sun screen and headliner for a vehicle.

2. Brief Statement of the Prior Art

Motor vehicles parked in full sunlight experience a very pronounced rise in interior temperature, and this problem is accentuated by the use of expansive glass areas such as wide windshields, sunroofs and the like. Various attempts have been used to provide reflective surfaces that reflect the sun's rays and eliminate or substantially reduce this "greenhouse" effect. The most popular of these approaches has been an inexpensive foldable sun screen which is typically formed of cardboard and the like and which is unfolded and placed inside the vehicle adjacent the windshield. While these sunscreens are very popular and relatively inexpensive, they have a number of shortcomings. They are cumbersome and considerable effort is required to unfold the screens and place them beneath the windshield. The sunscreens are also bulky and difficult to store when not in use. Additionally, the screens are not readily usable for the rear and side windows of the vehicle.

Sun visors which are commonly provided in vehicles have flat, single sheet shapes and are rotatably mounted to the inside roof or upper trim above the windshield, so they can be pivoted to position the visor along the windshield or along a side window. These visors have insufficient span and do not adequately shield the driver or passenger from the sun's rays.

OBJECTIVES OF THE INVENTION

It is an object of this invention to provide a sun screen for the windshield of a motor vehicle which will readily retract into the headliner of the vehicle.

It is a further object of this invention to provide a retractable sunscreen for the windshield and the rear window of a motor vehicle which retract into the headliner of the vehicle.

It is a further object of this invention to provide sunscreens for the windshield and rear and side windows of a motor vehicle which readily retract into the roof liner of the vehicle.

It is a further object of this invention to provide a motor driven retractable sunscreen to cover the windows of a motor vehicle.

It is also an object of this invention to provide a headliner for a vehicle which has storage recesses for window sun screens.

It is a further object of this invention to provide a sun visor for a vehicle which provides substantially complete protection to passengers and the driver of the vehicle.

BRIEF DESCRIPTION OF THE INVENTION

This invention comprises a retractable sun screen for a motor vehicle. The sun screen can be provided for any or all of the windows of the vehicle and is used in combination with a head liner which has a storage recess for each sun screen. The sun screens can be manually operated. In its most preferred embodiment, however, the operator for the sun screens includes a motor driven actuator to extend or retract the sun screens.

The sun screens are formed of thin film plastics, preferably of Mylar ® having a thickness from 1 to about 10 mils, preferably from 2 to about 5 mils, which are mounted on rollers that are slidably positioned in roller tracks located in the headliner of the motor vehicle. Preferably a sun screen is provided immediately adjacent each of the windshield, rear and side windows so that all of the windows can be protected with retractable sun screen. Most preferably, an electrical motor is provided to retract and extend the sun screens and the electrical motor is connected through a switch in the passenger compartment to the vehicle's electrical system.

The invention also includes a sun visor of expanded width and length which is foldable for full retraction from the windshield or side window.

BRIEF DESCRIPTION OF THE FIGURES

The invention will be described with reference to the figures of which:

FIG. 1 is a plan view of the headliner and sun screens used in a complete embodiment of the invention;

FIG. 2 is a perspective view of the top of the headliner of the invention showing the rear window sun screen extended;

FIG. 3 is a perspective view of a side window sun screen and its track in the headliner of the invention;

FIG. 4 is a perspective view of the track and roller used in the headliner of the invention;

FIG. 5 is a sectional view along line 5—5' of FIG. 3;

FIG. 6 is a sectional view along line 6—6' of FIG. 1;

FIG. 7 is an enlarged view of the area within line 7—7' of FIG. 6;

FIG. 8 is a sectional view of a headliner similar to FIG. 5, and having a motor driven operator for the sun screen;

FIG. 8A is an electrical schematic of the car battery and electrical motors.

FIG. 9 is a view of an unfolded sun visor of the invention;

FIGS. 10 and 11 illustrate the extendable positions of the components of the sun visor of the invention; and FIG. 12 illustrates a visor having a retractable sun screen for the invention.

DESCRIPTION OF PREFERRED EMBODIMENTS

Referring now to FIG. 1, there is illustrated a plan view of the headliner and sun screens of the invention. The headliner 10 is symmetrical along the longitudinal midline of the vehicle, and like, opposite elements have the same numbers. The liner is provided with a plurality of roller tracks, such as 16 which is located at the forward end of the vehicle and immediately adjacent the windshield of the vehicle; 18 and 20, which are located along the side of the vehicle and adjacent the front and rear side windows of the vehicle; and 22 which is located immediately adjacent the rear window of the vehicle.

The right and left sun screens 24 and 24' cover the windshield of the vehicle, and this split construction provides clearance for the conventional rear view mirror of the vehicle (not shown), which is usually located on the upper center area of the windshield. In applications in which the mirror is located at nonobstructing positions, a single piece sun screen which covers the entire width of the windshield can be used. Each sun screen 24 and 24' is extendable into the position shown by the solid lines and is retractable into the headliner of the vehicle, moving into tracks 16 and 16'. For this purpose, the headliner 10 has roller 26 which is rotatably and slidably received within roller slots (described hereinafter) at opposite sides of each track 16 and 16'.

In a similar fashion, tracks 18 and 20 are provided with slidably mounted rollers 30, and 34 at each side of the motor vehicle. The forward portion of roller tracks 18 and 20 extend beneath the roller track 16 in groove 33, as will be described in greater detail hereinafter. At the rear of the vehicle, rear roller track 22 is provided in the headliner and this track movably receives roller 40 to provide support for the sun screen 46 as it moves between retracted and expanded positions.

Each of the tracks slidably receives a thin film sun screen 42, 44 and 46. The sun screens are shown as they would be extended and immediately adjacent the windows of the vehicle. The sun screen 42' for the left front side window is shown in the plane of the drawing in phantom lines to illustrate its outline. The sun screen is preferably formed with a supporting, flexible frame 28. The sun screen preferably has a sliding, triangular panel 51 which extends forward to cover the vent window of the vehicle and slides into frame 28 when the sun screen is to be retracted into the head liner.

The sun screens can be formed of a suitable thin film plastic, preferably of Mylar ®, having a thickness from about 1 to about 5 mils. Preferably, the sun screens are surrounded by a thin, flexible frame, which is also formed of plastic film or extrusion. The sun screens preferably are provided with highly reflective surfaces, e.g., colors or opaque additives can be incorporated in the plastic, or the surfaces of the plastic film can be metallized to provide maximum heat and radiation reflective properties.

Referring now to FIG. 2, the head liner is shown without the rollers 30, 30', 34 and 34'. The tracks 18 and 20 to each side of the vehicle are shown as formed by a center rib 52 and a front chamber 54 and a rear chamber 56 which house the front and rear roller tracks. The head liner can be molded of sheet plastic and is sized to replace the conventional head liner of the vehicle. The rear window sun screen 46 is shown extended from the rear chamber 56. It has a flexible frame 49 and preferably has triangular-shaped sliding end panels 47 and 47', which can be extended to cover the entire window. When the sun screen 46 is to be retracted into the head liner, the end panels 47 and 47' are slid into the frame 49, as shown for the right side end panel 47.

Referring now to FIG. 3, the rear portion of the head liner 10 is shown, with sun screen 44' partially extended from its recessed track 20'. In this position, the sun screen extends downwardly, and flexes so that it lies flat against the opposed surface of the window of the vehicle. The surrounding frame 45' is sufficiently flexible to assume the curved contour as required for the sun screen to hang adjacent the window.

The thin film sun screen such as 44' is attached with one longitudinal side edge 58' secured to the roller 34' so that the retraction and advancement of the roller 34' in the receiving slots of the track 20' will retract or extend the thin film sun screen 44' into retracted and rear side window covering positions.

The construction of the track and receiving slots for the rollers is more apparent from FIG. 4, which is an enlarged view of track 18 at the right front side window. As there illustrated, the track is formed between the front chamber 54 and the center rib 52. Horizontal slots 62 and 64 are formed into the opposed edges of these members and these slots extend forward, beneath the track 16. This is shown by the groove 33 in the illustration. The roller 30 is slidably and rotatably received within the slots. At their lateral edges, the slots can have a downwardly inclined lip 61 to impart a directional bend to the plastic film sun screen 42. As previously mentioned with reference to FIG. 1, the sun screen has a surrounding frame 28 and a forward portion 51 which slides past line 50.

FIG. 5 illustrates the slot and roller relationship in greater detail. As there shown, slot 60' is formed in the side wall of the rear chamber 56 and has slightly greater width than the diameter of the roller 34'. The plastic film which forms the sun screen 44' has its upper longitudinal side edge 58' secured to the roller 34' so that this roller will slide along the slot 60 as the plastic film is pulled out or pushed through the slit 68 at the lower, outer edge 70 of the head liner 10.

Preferably, the movement of the rollers within their tracks can be controlled by an automatic operator. FIG. 8 illustrates this modification of the invention. As shown, the rollers 34' and 36' are permanently seated at opposite ends of the slots such as 60, and are rotationally mounted therein, preferably with roller bearings (not shown). A continuous belt 72 is mounted about the rollers, and one of the rollers, such as 34' has a pulley or sprocket gear 74 which is driven by a belt or chain 76 which extends over a drive pulley or gear 78 that is mounted on the output shaft of an electrical motor 80.

The drive motor 80 can be electrically connected to the vehicle's electrical system through a switch located at the driver's compartment, for remote actuation of the sun screens.

As shown in FIG. 8A, the drive motors 80, 80' and 80" are in circuit through switch means 79 to the electrical system of the car which includes the car battery 77. The switch means 79 can be located in the passenger compartment.

The sun screen 44' extends into the recess or track 20' formed within the headliner 10, through slit 68 and extends up and over the end of the belt 72 so that as the belt moves, it will push or drag the sun screen out of, or into the track 20'. For this purpose, one side edge 58 of the sun screen 44' can be permanently attached to the belt 72, thereby insuring that it is not inadvertently ejected from the track 20'.

FIG. 6 is a sectional view of the front track 16, which supports a roller 26. The roller can be rotationally and slidably supported in the receiving slots 65 and 67 by bearings 82.

The construction of the head liner 10 will be more apparent from the enlarged view which is shown in FIG. 7. The headliner 10 has an upper insulation space 84, which can be filled with a suitable insulation material such as plastic foam, and a transverse brace 86, all located above the roller 26. A clearance space 88 is beneath the roller and a second transverse brace 90 spans the head liner for structural strength. The remainder of the headliner is the frame 92, which can also be a foamed plastic such as polyurethane foam.

As previously mentioned, the invention also includes a sun visor 100, which is shown in FIG. 9. The sun visor 100 is mounted to the vehicle with a support post 102 that is pivotally secured in the vehicle with a pivotal joint such as a ball and socket joint 104. Support post 102 has a telescoping section to permit it's extension for a distance of from 1 to 3 inches. The visor 100 has a right angle arm 106 with a longitudinal section 108 that is received within the visor to provide a rotatable support for the visor, as in a conventional visor. The visor of this invention, however, has a plurality of foldable panels including a lowermost panel 110 which is secured to a bottom edge 112 of the visor 100 with a sleeve 114 that is slidably received over a longitudinal arm 116 that extends along the bottom edge of the visor 100. The visor 100 can also have a retractable end panel 129 which slides into a slot 127 formed in the end edge of the visor panel 100.

As shown in FIG. 9, the lowermost panel can be swung down to its illustrated position. It also can be extended to either side, bracket 114 sliding along arm 116, e.g., to the extended position 111 which is shown in phantom lines. When the lowermost panel is folded into its retracted position, it can be secured by suitable attachment means, e.g., Velcro ® tabs 118 and 120 which are placed on opposing surfaces of the main visor panel 100 and the lowermost panel 110.

The arm 116 is pivotally secured to the visor panel 100, preferably by a sleeve bracket which permits the entire assembly of the central and lower panels to be rotated 180 degrees, to the position shown in FIG. 10. FIGS. 10 and 11 are intended only to illustrate various positions of the panel 110, and do not show the thicknesses of the visor 100 and lower panel 110.

The panel 110 can also be extended into the position shown in FIG. 11, where it has been slid to its maximum extension with sleeve bracket 114 against a stop on the end of arm 116.

Referring now to FIG. 12, there is illustrated a sectional view through the visor 100, with the lower panel 110 folded into its retracted position. The visor 100 has an upper hollow cylindrical edge 120 with a central longitudinal cavity 124. A roller 126 is rotationally supported in the cavity 124, coaxial with arm 108, and a sun screen 122 is secured to the roller. The sun screen extends out of the cylindrical edge through a slot which is opposite from the visor panel 100. As the roller is rotated, it extends or retracts the sun screen 122. The roller can have an actuator knob 128 mounted on the end of the visor, as shown in FIG. 9.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. In a motor vehicle having a forward facing windshield and a roof enclosing a passenger compartment, the improvement comprising:
   a. a head liner received immediately beneath said roof and enclosing a narrow roof space therebetween;
   b. a windshield screen of thin film plastic having a thickness from 1 to about 5 mils of sufficient width and length dimensions to span said windshield and movable between a windshield covering position and a withdrawn position;
   c. a roller track adjacent to said windshield and located within said narrow roof space and including opposite side roller track slots orthogonally positioned relative to said windshield;
   d. roller means with its opposite ends movably supported in each of said opposite side slots;
   e. means attaching one longitudinal side edge of said windshield thin film screen to said roller means, whereby said roller means is operative to slide along said roller track and thereby retract said screen from covering position and into said withdrawn position; and
   f. a supporting and flexible frame surrounding said thin film screen to permit said screen to be pushed along said roller track.

2. The vehicle of claim 1 wherein said screen is formed of Mylar ®.

3. The vehicle of claim 1 including first motor means operatively connected to said roller means.

4. The vehicle of claim 2 wherein said first motor means is electrically powered.

5. The vehicle of claim 3 wherein said motor vehicle has an electrical system, including electrical storage battery and wherein said first motor means is in circuit to said electrical system through switch means with said passenger compartment.

6. The vehicle of claim 1 wherein said motor vehicle has at least one rear window also enclosing said passenger compartment, and wherein a rear window screen of thin film plastic having a thickness from 1 to about 5 mils is located at the rear of said vehicle and is of sufficient dimensions to span said rear window, together with a second roller track located at the rear of said head liner, together with second roller means operative to move said rear window thin film screen between retracted and rear window covering positions, and including a supporting, flexible frame surrounding said thin film screen to permit said screen to be pushed along said roller track independently of movement of said windshield thin film screen.

7. The vehicle of claim 6 wherein said rear window screen is formed of Mylar ®.

8. The vehicle of claim 6 including second motor means operatively connected to said second roller.

9. The vehicle of claim 8 wherein said second motor means is electrically powered.

10. The vehicle of claim 9 wherein said motor vehicle has an electrical system, including electrical storage battery and wherein said second motor means is in circuit to said electrical system through switch means within said passenger compartment.

11. The vehicle of claim 1 wherein said motor vehicle also has at least one side window also enclosing said passenger compartment, and wherein a side window thin film plastic having a thickness from 1 to about 5 mils is located at the side of said vehicle and is of sufficient dimensions to span said side window, together with third roller track means and third roller means slidably mounted thereon at the side of said head liner and operative to move said side thin film screen between retracted and side window covering positions, and including a supporting, flexible frame surrounding said thin film screen to permit said side thin film screen to be pushed along said roller track independently of movement of said windshield and rear window thin film screens.

12. The vehicle of claim 7 including side windows on each side of said vehicle, and including a respective one side window film screen at each of said side windows.

13. The vehicle of claim 12 wherein said side window screens are formed of Mylar ®.

14. The vehicle of claim 12 including third motor means operatively connected to said third roller means.

15. The vehicle of claim 14 wherein said third motor means is electrically powered.

16. The vehicle of claim 15 wherein said motor vehicle has an electrical system, including electrical storage battery and wherein said third motor means is in circuit to said electrical system through switch means within said passenger compartment.

17. The vehicle of claim 1 wherein said vehicle has rear, right and left side windows located at the rear, left and right sides, respectively of said vehicle and wherein a plurality of said screens are provided, one each at the rear, left and right sides of said vehicle, each screen being of sufficient dimensions to span its respective window and located in said passenger compartment to cover its respective window, and including a plurality of roller track means, one each located at the rear, right and left sides of said narrow roof space, each with moveable roller means received within respective roller track means, with each of said rear, left and right thin film screens being secured with one of its longitudinal side edges to a respective one of said rollers, and including a supporting, flexible frame surrounding each of said screens to permit said screens to be pushed along said roller track independently of movement of each other and of said windshield thin film screen whereby said rollers are effective to move said screens between their retracted and widow covering positions.

18. The vehicle of claim 17 wherein said all said screens are formed of Mylar ®.

19. The vehicle of claim 17 including a plurality of electrically powered motor means, one each operatively connected to each of said roller means.

20. The vehicle of claim 19 wherein said motor vehicle has an electrical system, including electrical storage battery and wherein said each of said motor means is in circuit to said electrical system through switch means within said passenger compartment.

* * * * *